April 11, 1961 H. ERDMANN 2,978,801
MEANS FOR ASSEMBLING "OPEN" SPRING-RETAINING RINGS
Filed Feb. 2, 1955 5 Sheets-Sheet 1
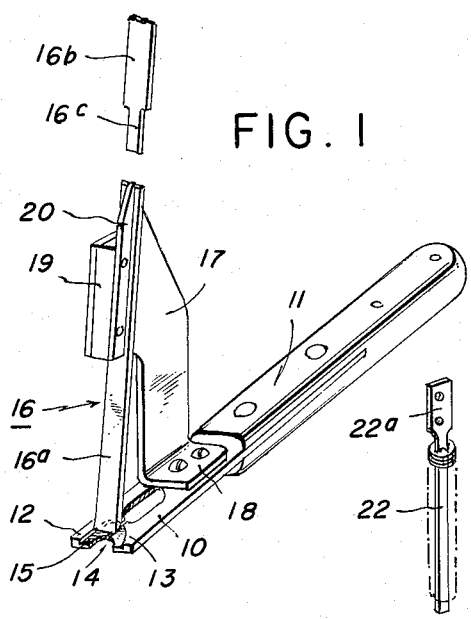
FIG. 1
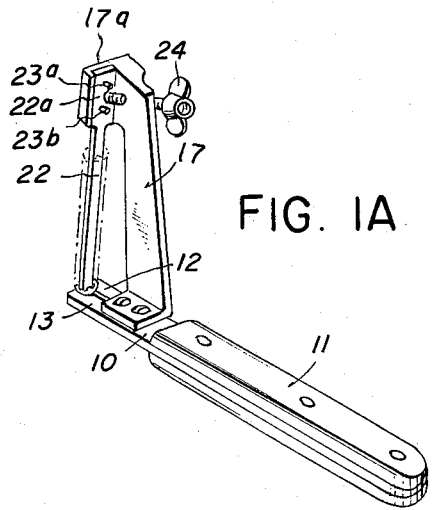
FIG. 1A
FIG. 1B
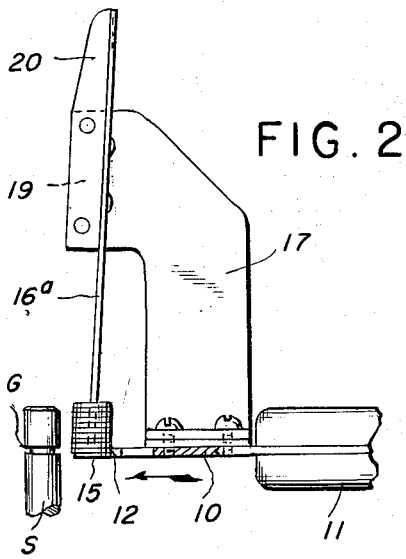
FIG. 2
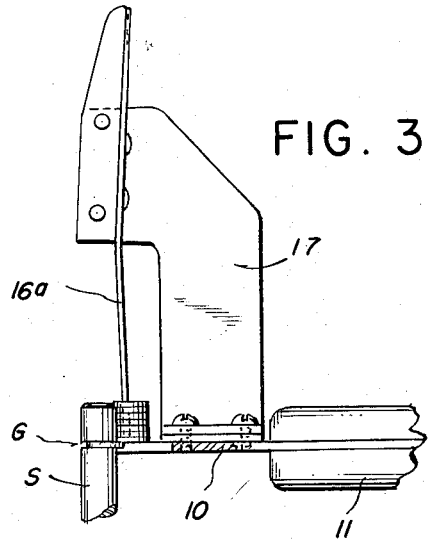
FIG. 3
INVENTOR
HANS ERDMANN
BY
ATTORNEY April 11, 1961 H. ERDMANN 2,978,801
MEANS FOR ASSEMBLING "OPEN" SPRING-RETAINING RINGS
Filed Feb. 2, 1955 5 Sheets-Sheet 2

INVENTOR.
HANS ERDMANN
BY
ATTORNEY

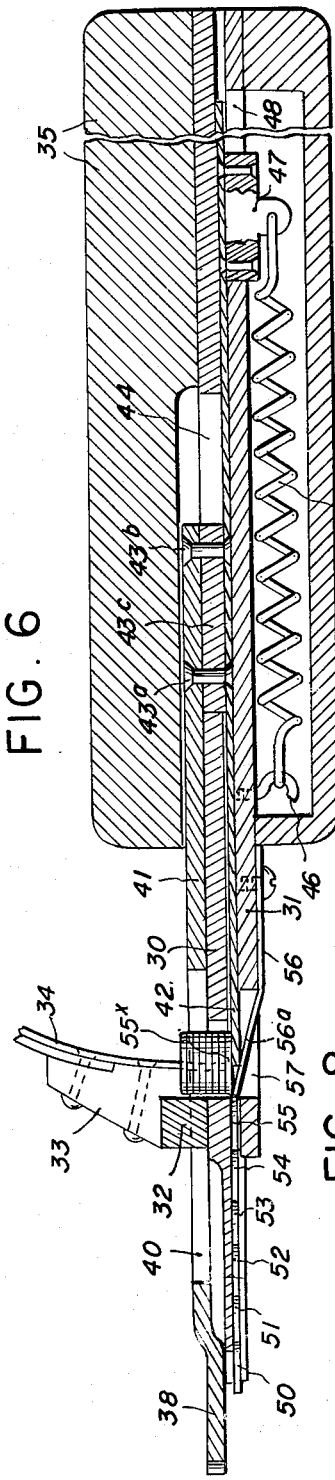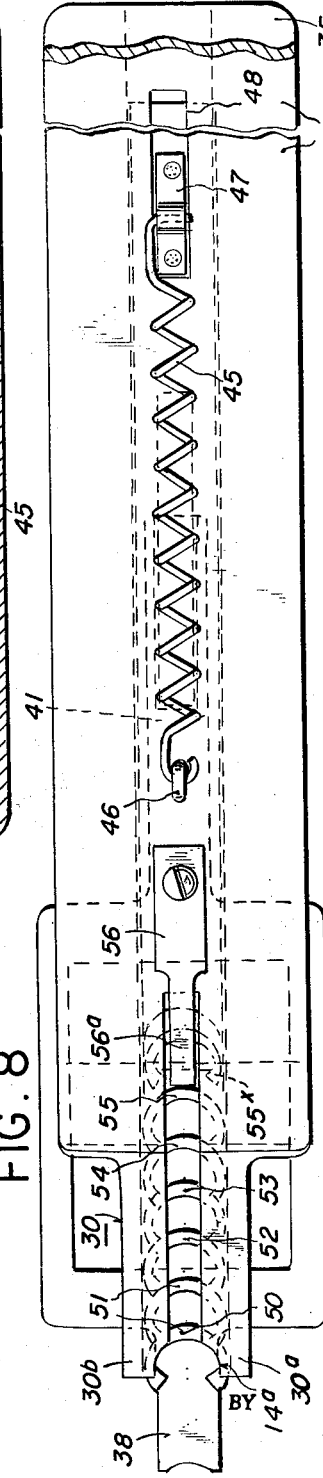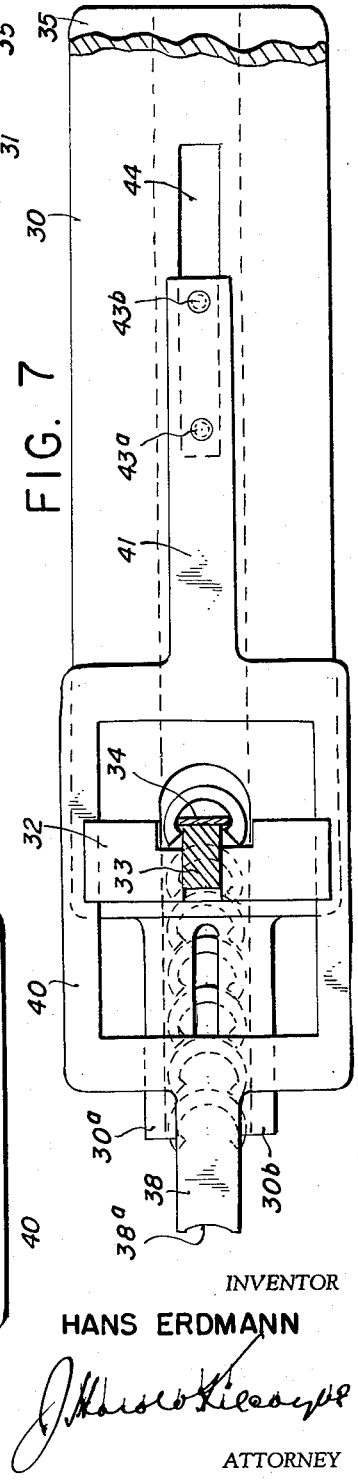

April 11, 1961 H. ERDMANN 2,978,801
MEANS FOR ASSEMBLING "OPEN" SPRING-RETAINING RINGS
Filed Feb. 2, 1955 5 Sheets-Sheet 4
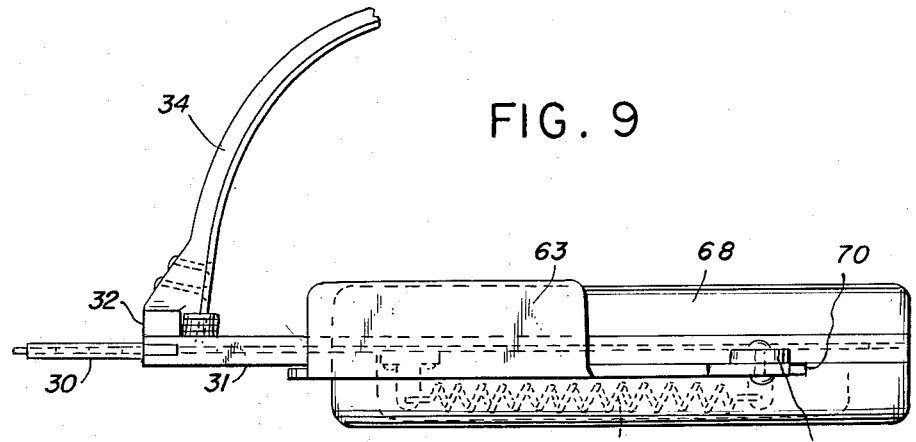
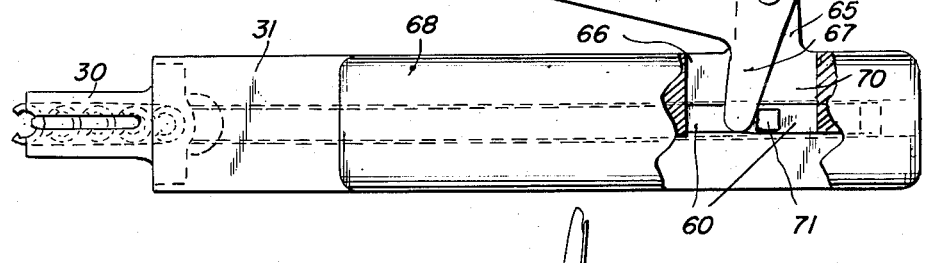
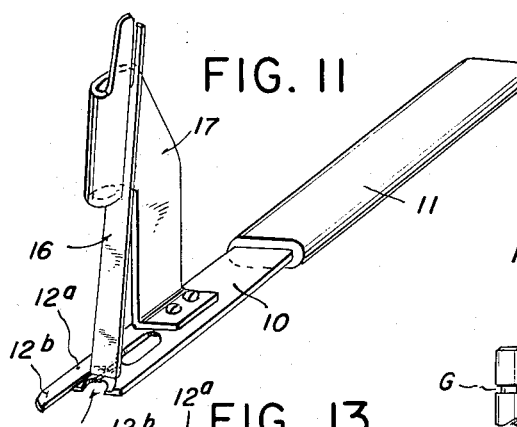
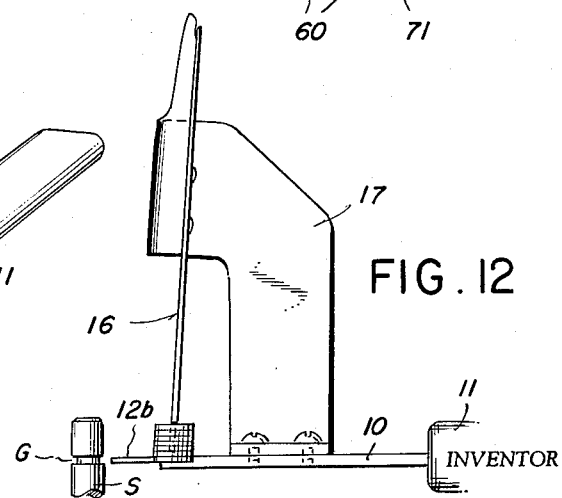
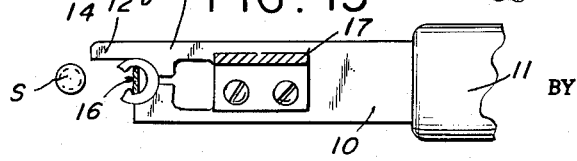
INVENTOR
HANS ERDMANN
BY
ATTORNEY

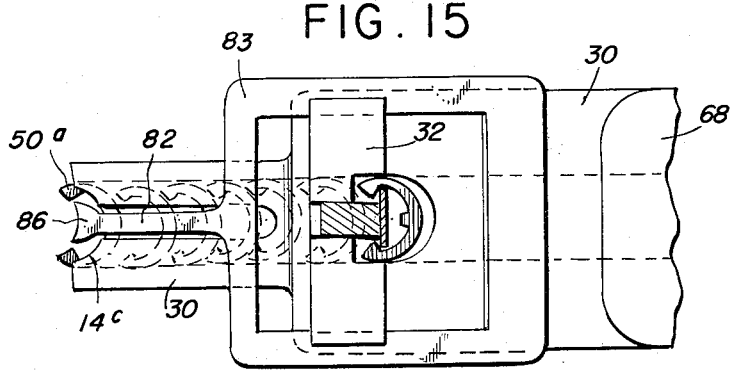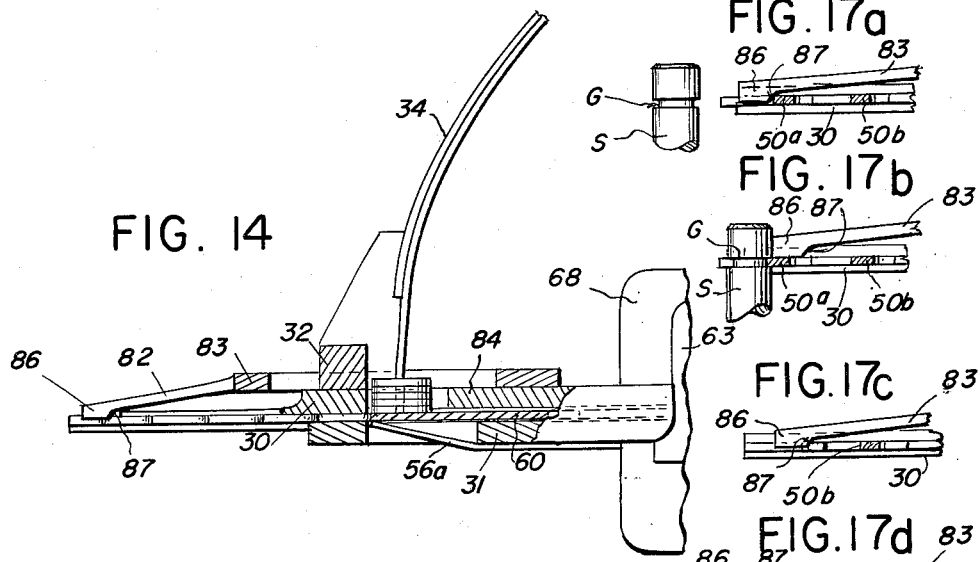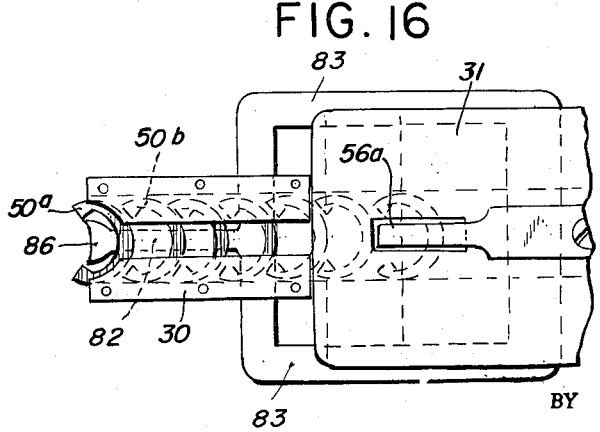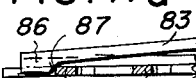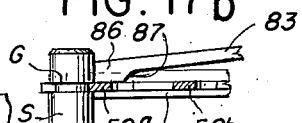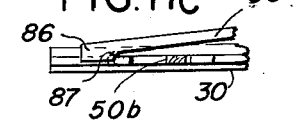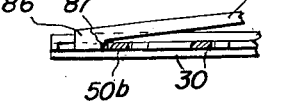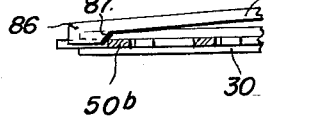

United States Patent Office 2,978,801
Patented Apr. 11, 1961

2,978,801

MEANS FOR ASSEMBLING OPEN SPRING-RETAINING RINGS

Hans Erdmann, Maplewood, N.J., assignor to Waldes Kohinoor, Inc., Long Island City, N.Y., a corporation of New York Filed Feb. 2, 1955, Ser. No. 485,785

8 Claims. (Cl. 29—212)

This invention relates to improvements in means for assembling "open" spring-retaining rings on their shaft or pins and, more particularly, to a combination tool for dispensing such rings singly from a supply thereof maintained in stack or column formation on a stack rod and for applying the single rings to their grooved shafts, as required.

Based on the disclosures of my prior applications, more particularly applications Serial No. 298,869, filed July 14, 1952, now Patent No. 2,819,818 and Serial Nos. 371,359 and 371,360, filed July 30, 1953 (now Patent No. 2,712,398, dated July 5, 1955 and Patent No. 2,735,-581, dated February 21, 1956, respectively), it is now well known to withdraw retaining rings singly from a so-called dispenser, wherein they are disposed in stack formation on a stack rod, by means of a so-called applicator tool also functioning as a means for applying or assembling the rings as they are withdrawn in their shaft grooves. While admirably serving the purpose for which they were designed, the prior ring dispensers and applicators are open to the objections that they are completely separate one from the other; that the dispensing means comprises a fixed piece of mechanism incapable of being manually moved about at the will of the operator; and that therefore the applicator must be manually moved to, cooperated with, and retracted from the dispensing means in order to execute a dispensing operation, such being in addition to the movement required to be imparted to the applicator in causing the latter to exercise its ring applying function. Thus, it will become apparent that the known means for dispensing and applying open retaining rings to their shafts, pins and the like are relatively cumbersome in structure and slow in operation.

On the other hand, the large-scale use of open retaining rings required by present-day production-line manufacturing and machine assembly techniques makes it desirable, if not imperative, not only that the procedure of dispensing and applying the open retaining rings be mechanized, but also that it be simplified and speeded up in so far as such is physically possible. Accordingly, it is the main object of the present invention to meet this need by mechanizing and further simplifying the prior means and procedures employed in dispensing open retaining rings from a supply thereof and assembling the single rings in the groove of a shaft or pin provided therefor as required.

A more specific object is the provision of a hand tool or appliance which combines the hitherto separate ring dispensing means and the ring applying means into a single tool entity.

Yet another object of the invention is the provision of a single piece of mechanism for dispensing open retaining rings singly from a stack thereof and for applying the single rings to a grooved shaft, pin or the like, as required, having the form of a portable hand tool which may be operated at a fast rate simply by pushing same against the shaft or pin containing the groove in which a ring is to be assembled.

A further object of the invention is the provision of a hand-operated tool or appliance effective both to dispense single retaining rings from a supply thereof arranged in column formation and to project the rings individually into their shaft grooves.

A still further object of the invention is the provision of a fully portable tool-like appliance for applying open spring retaining rings to their shafts, pins or the like, characterized by the incorporation therein of means for storing a supply of the retaining rings to be applied and for dispensing said rings singly in response to the appliance being cooperated with the shaft to which a ring is to be applied.

A still further object is the provision of a hand-tool type of device for dispensing and applying retaining rings to shafts, pins and the like, which is so constructed and arranged as to provide a supply of the retaining rings to be applied in stack formation and which is further operative to pick off the lowermost ring from the stack thereof and to position it in an "assembly-readiness" position responsively to the tool being pushed against the shaft or the shaft being pushed against the tool.

A still further object of the invention is a combination tool for dispensing single retaining rings from a vertical stack thereof carried by the appliance and for applying said rings to grooved shafts, pins or the like, as required, and which is further characterized by means for guiding the ring into the shaft groove.

The above and other objects of the invention will appear from the following detailed description, in which reference is had to the accompanying drawings illustrating various forms of a tool or appliance according to the invention, wherein:

Fig. 1 is a perspective view of one form of combined ring dispensing and applying tool according to the invention;

Fig. 1A is a perspective view showing a slightly modified form of combined ring dispensing and applying tool;

Fig. 1B is a detail vew illustrating the removable one-piece spring stack rod featuring the Fig. 1A form of device;

Figs. 2 and 3 are side views of the combined ring dispensing and applying tool shown in Fig. 1, of which Fig. 2 illustrates the tool being moved towards a shaft preliminary to the actual applying operation, and Fig. 3 illustrates the section of the tool in applying a ring to said shaft;

Figure 5:
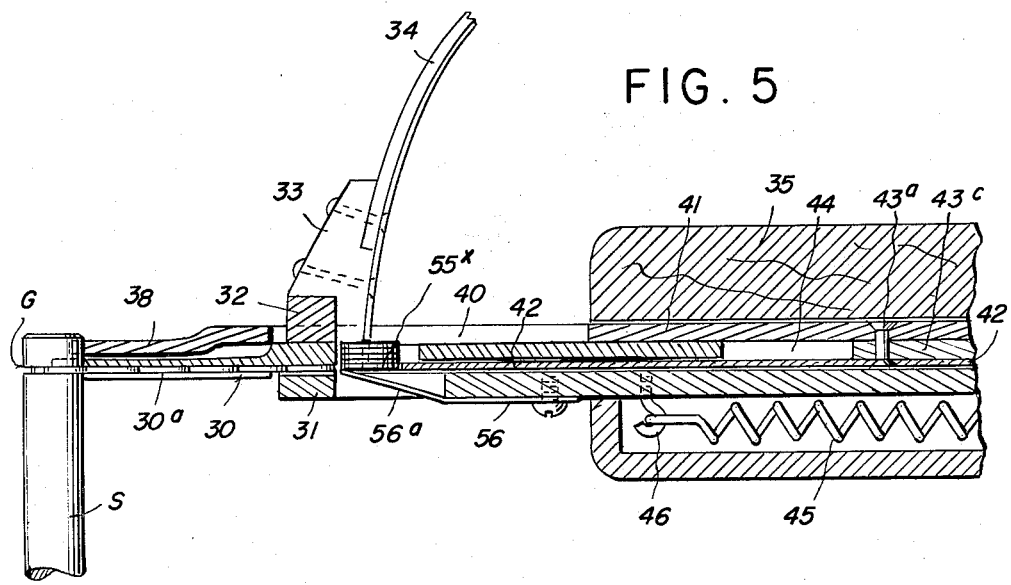

Figs. 5 and 6 are partial side elevations, largely in section, illustrating another form of combined ring dispensing and applying tool according to the invention, Fig. 5 illustrating the pushbar in its retracted position to which it is urged responsively to the tool being pressed against the shaft on which a ring is to be applied, and Fig. 6 illustrating the pushbar in its normal or forward position;

Figs. 7 and 8 are partial top plan and bottom plan views, respectively, of the tool shown in Fig. 6;

Fig. 9 is a side view and Fig. 10 a bottom plan view of another form of retaining ring dispensing and applying tool according to the invention;

Figs. 11, 12 and 13 are perspective, partial side elevation and partial plan views, respectively (Fig. 13 being partially in section), illustrating a modification of the aforesaid Fig. 1 form of tool;

Figs. 14, 15 and 16 are side elevational (partly in longitudinal section) top and bottom plan views, respectively, of the front portion of a modified Figs. 9 and 10 form of tool; and Figs. 17a–17e, inclusive, are diagrammatic views illustrating the action of the guiding means characterizing the Figs. 14–16 embodiment.

Referring to the drawings, and more particularly to Figs. 1–3, reference numeral 10 indicates the blade member of an applicator whose rearward end is provided with a handle 11 whereby it may be carried about and handled similarly to a bladed tool. Preferably, the applicator is of the general type disclosed and claimed in patent to Brell No. 2,483,379, dated September 27, 1949, and accordingly the forward end of its blade terminates in resiliently interconnected arcuate jaws 12, 13 together defining a substantially semi-circular recess 14 for an "open" retaining ring which, as is well known, comprises an arcuate ring body of spring metal whose inner edge extends along an arc that only slightly exceeds 180°, whereby it may be assembled on its shaft by spreading it directly over same in the plane of the groove provided therein to receive said ring. Preferably, the inner edges of the jaws which define the recess 14 are undercut or stepped back so as to provide both an abutment edge and an edge seat for the ring received therein, and also to provide said jaws with an inwardly directed flange 15 serving not only as a supporting ledge for a ring disposed in said recess which prevents a ring entering the recess from above from dropping therethrough, but also as a backing flange which prevents the ring from being knocked from the recess when struck by an object or part from above.

According to the invention, an applicator blade member 10 as aforesaid mounts a stack rod generally designated 16 on which a plurality of the retaining rings being assembled may be mounted in vertical stack formation. In the Figs. 1–4 form of tool, the stack rod 16 is affixed to an upright bracket 17 having a foot flange 18 which is screwed or otherwise secured to the applicator blade member just forwardly of the handle 11, the bracket at its upper end having a forwardly offset portion mounting a block 19, to the rear side of which said stack rod is secured as by screws or rivets. Thus, the stack rod extends generally at a right angle to the operating plane of the applicator member.

Preferably, the stack rod 16 comprises upper and lower sections 16a, 16b of which the lower section has the form of a spring rail whose upper end is affixed to the block 19 so that it extends downwardly therefrom as a leaf spring, and whose lower end terminates above the aforesaid ring recess 14 and in a plane which is slightly above that of the upper surface of the applicator blade member 10. Thus, the spring rail 16a portion of the stack rod may flex rearwardly from its normal position shown in Fig. 2, in which it disposes a stack of rings thereon directly above the ring receiving recess 14 of the applicator.

The upper section 16b of the stack rod is adapted to be detachably connected to the spring rail portion 16a thereof. For this purpose, the upper end of the spring rail 16a is grooved for the reception of a tongue 16c depending from the lower end of the detachable stack rod section, the rear wall of the groove forming with the rear edge of a rigid strip 20 which is secured to the block 19 (Fig. 1) a pocket for the reception of said tongue. Thus, a plurality of retaining rings threaded on to the detachable stack rod section 16b may be sold as an assembly package, the purchaser being required merely to assemble said stack rod section 16b to the fixed spring rail section 16a thereof. Thereupon, the plurality of rings form a substantially vertical ring stack or column which lowers by gravity on to said spring rail section and finally to a position such that the lowermost ring thereof is received in the applicator recess 14, being supported in and restrained from dropping through said recess by the supporting and backing flange 15.

The manner of using a combined retaining ring dispensing and applying tool as described will be clear from a consideration of Figs. 2 and 3. In both of these views it will be assumed that an operator is holding the tool by its handle 11 at a level such as to dispose its ring receiving recess 14 in the horizontal plane of the groove G of a shaft or pin S in which a ring is to be assembled, and that in Fig. 2 the operator is moving the tool against the shaft in the plane of its applicator blade 10. Upon the operator finally engaging the tool with and pushing it against the shaft S, two operations take place. First, the lowermost ring of the stack is forced into the shaft groove G until it seats against the groove bottom with a gripping power which, by design, is greater than that exerted on the ring by the applicator jaws 12, 13, whereby, upon the latter being backed from the shaft, said jaws release themselves from the now seated ring. Secondly, as the lowermost ring is pushed forwardly into its groove, all of the rings of the stack above said lowermost ring are pushed rearwardly by engagement of the shaft therewith as in Fig. 3, such rearward movement being permitted by the flexibility of the spring rail section 16a of the stack rod. This ability of the spring rail 16a to flex finally results in the stack of rings threaded thereon moving forwardly upon the tool being backed off or retracted from the shaft S, whereupon the next lowermost retaining ring of the stack is free to lower into the applicator recess 14, which it proceeds to do, thereby conditioning the tool for the next ring dispensing and applying operation.

In the case of very small retaining rings, a one-piece stack rod may be employed rather than the two-part stack rod 16. Such a one-part stack rod designated 22 (Figs. 1A and 1B) has the form of a spring rail so that it may function similarly to the spring rail portion 16a of the previously described stack rod. However, it differs from said spring rail section or portion 16a in that it is detachable from its mounting bracket, thereby to permit substitution of another (spring rail) stack rod 22 carrying a fresh supply of rings. For this purpose, its upper portion 22a is formed wide and said widened portion, which seats in a rearwardly facing recess formed in a lateral top extension 17a of the bracket, is provided with apertures adapted to receive pins 23a, 23b which project from said bracket extension. A thumb screw 24 is threaded through the upper end of the bracket at an angle such that its shank end is adapted to press against the aforesaid widened portion 22a of the spring rail 22. Thus, a ring-loaded spring rail 22 may be detachably secured in operative position in the bracket 17 by passing the pins 23a, 23b through the apertures of its widened upper end portion 22a and thereupon tightening the thumb screw 24. To detach the spring rail 22, for example for the purpose of substituting a loaded spring rail for one whose rings have been exhausted, the foregoing rail-securing operations are reversed.

Figure 4:
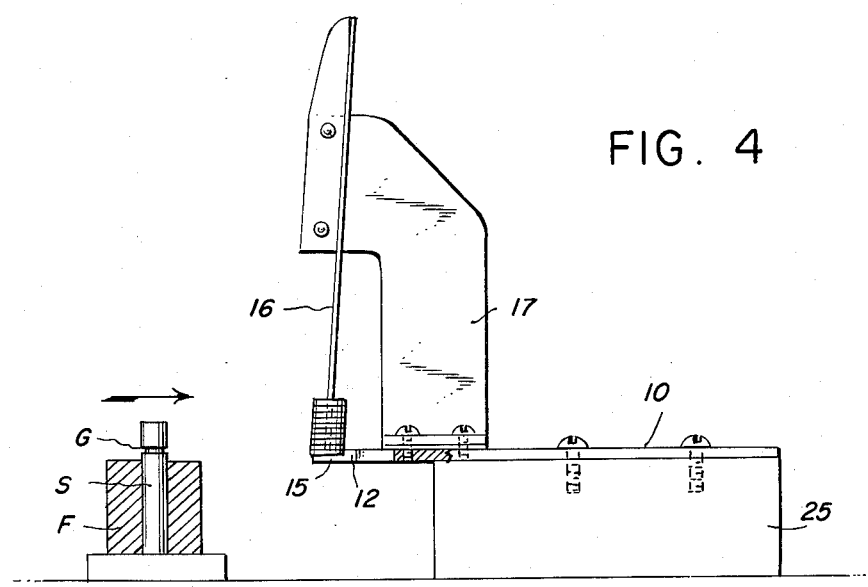
Fig. 4 is a side elevation of a modified arrangement according to which the basic ring dispensing and applying tool parts are stationarily mounted rather than being carried by a handle, and illustrating the manner of using such a tool.

A combined retaining ring dispensing and applying tool, of the form generally illustrated in Figs. 1–3 but without the handle 11, may be stationarily mounted as in Fig. 4. In this modification, the rear end of the blade member 10 is secured to a base 25 stationarily mounted on a suitable support. When so mounted, a work piece which is to receive a ring and which may be the previously described shaft S having a groove G held in a fixture F is moved bodily against the applicator to effect a ring dispensing and applying operation, which is a substantial reversal of the tool being moved against the work piece (shaft), as in the prior described modification.

According to the further form of retaining ring dispensing and applying tool depicted in Figs. 5–8, inclusive, the applicator proper illustratively comprises a blade member 30 having a ring recess 14a at its forward end, and which is fixed to and extends forwardly of a bottom plate 31 and is similarly fixed to and extends forwardly of a fixed cross head 32. To said cross head is affixed an upright bracket 33, to which is in turn affixed the lower end of a stack rod generally designated 34, which is preferably of two-part flexible (spring-rail) construction. It is also preferred that, rather than extending vertically, the stack rod 34 be bent or inclined so as to slope rearwardly, thereby to reduce the overall vertical height of the tool including the stack rod.

As best seen in Figs. 7 and 8, the forward end portion of the blade member 30 of the tool form under consideration, i.e. the portion extending between stack rod and ring recess, comprises laterally spaced side rails 30a, 30b provided in their mutually facing side edges with grooves of depth corresponding to the axial thickness of the retaining rings being dispensed and which are spaced laterally a distance corresponding to the external diameter of said rings. Thus, the grooves define a slide-way extending between the stack rod and the ring recess 14a for a plurality of rings disposed in tandem relation. Here it will be noted that the lower end of the stack rod 34 terminates above this slideway a distance of at least the thickness of a single ring, so as not to block or interfere with movement of a ring (or a slide) along said slideway.

The aforesaid stationary parts 30—34 are adapted to be carried by a handle 35 affixed to the rear end of the bottom plate 31. Cooperatively related to the applicator proper is a pushbar and feeder slide assembly, of which the pushbar 38 normally extends forwardly of the forward end of the applicator blade member 30 and preferably terminates in a concave shaft-abutting end edge 38a (Fig. 7). Intermediate its ends the pushbar 38 is formed as a rectangular frame 40 having sliding bearing in outwardly facing grooves provided in the side edges of the fixed cross head 32. As seen in Fig. 6, the rear end 41 of the pushbar extends into a hollow of the handle 35 provided for its reception, and is secured to the feeder slide 42 of the aforesaid assembly as by rivets 43a, 43b which also secure a bridging block 43c operating in a slot 44 provided in the rearward, handle-enclosed end of the applicator blade member 30. Although only generally shown, it will be understood that the rearward end of said applicator blade member is channeled in its under face to provide a channel in continuation of the aforesaid slideway for reception of the feeder slide 42. Hence, the latter may reciprocate in the plane of the aforesaid slideway and into the end thereof.

As best seen in Figs. 5 and 6, the pushbar and feeder slide assembly is normally urged to its forward position by means of a tension spring 45 contained in a hollowed-out portion of the handle 35, one end of the spring being secured to the bottom plate 31 as by a hook 46, and the other end being affixed to the feeder slide 42 as by means of an eye member 47 depending from and affixed to the under face of the feeder slide and operating in a slot 48 formed in the rear end of the bottom plate 31. In its normal (forward) position aforesaid, the forward end of the feeder slide 42 underlies the lowermost retaining ring of the stack thereof directly mounted on the stack rod 34. In this normal position of the parts, the rearward ring of the series thereof designated 50–55 disposed in tandem relation in the applicator slideway is abutted by the forward, upwardly inclined free end 56a of a spring finger 56 which extends into a small-width slot 57 provided therefor in the bottom plate 31, said spring finger being affixed at its rearward end to the under face of said bottom plate. Thus, assuming that the rings 50—55 directly about one another, the foremost ring 50 will be firmly held against rearward movement by the spring finger 56 upon the applicator blade being pushed against a shaft in whose groove said ring is to be assembled.

While it is believed that the operation of the combined ring dispensing and applying tool of the Figs. 5–8 form will be clear, a brief description thereof is offered: Normally, the forward end of the pushbar 38 is disposed forwardly of the applicator blade member 30 as will be clear from a consideration of Figs. 6–8 which illustrate the normal relationship of the tool parts. When it is desired to dispense and assemble a ring in the groove G of a shaft or pin S, for example, the tool is moved against a shaft by the operator who holds same by its handle 35 at a level such that the ring slideway containing the rings 50—55 is at the level of the shaft groove. Continuing movement of the tool results in the concave pushbar edge 38a abutting the shaft. Further and final movement of the tool towards the shaft then results in (a) the most forward ring 50 being forced into the shaft groove G, and (b) in retracting movement of the pushbar and feeder slide assembly against the bias of spring 45, coupled with its return movement to normal position. When (b) occurs, the feeder slide 42 is moved rearwardly of the stack or column of rings mounted on the stack rod 34, whereupon the lowermost ring of the stack (designated 55x) drops through an opening provided therefor in the applicator body at the rearward end of the applicator slideway on to the upper surface of the bottom plate 31 which is at the level of said applicator slideway and communicating slide channel. Upon the tool being retracted from the shaft, as results in the most forward ring 50 of the series 50—55 thereof being left on the shaft, the pushbar and feeder slide assembly returns to its normal or forward position consequent to the pull of the spring 45. In this return movement the feeder slide 42 first moves against said ring 55x of the stack which has lowered into the slideway as aforesaid, and thereupon advances same along the applicator slideway to the position formerly assumed therein by the ring designated 55. Such of course results in the rings designated 51—55x being advanced to the position formerly held by rings 50—55, whereupon the tool is conditioned for the next dispensing and applying operation.

Figs. 9 and 10 illustrate yet another form of retaining ring dispensing and applying tool according to the invention which, while operating on the principle of the tool form illustrated in Figs. 5–8, does away with the pushbar 38 of said prior described form. Instead, the feeder slide 60 (which corresponds to the previously described feeder slide 42) is retracted against the force of a spring 61 (corresponding generally to the previously described spring 45) by means of a hand lever designated 62. Said hand lever, which is provided with a thumb piece 63 for its easy manipulation, is formed as an L-shaped bellcrank pivotally connected as by a pivot 64 to a lateral extension 65 on the bottom plate 66 of the applicator assembly (corresponding to the previously described bottom plate 31). One arm 67 of the hand lever projects into the applicator handle 68 through a slot 70 provided therein, and engages with a pin 71 depending from the under face of the feeder slide 60.

Normally, spring 61 maintains the feeder slide 60 in its advanced position in which its forward end underlies the stack of rings on the stack rod (corresponding to the stack rod 34) and similarly maintains hand lever 62 in its extended position shown in Fig. 10. However, upon the handle lever 62 being swung against the handle 68 by thumb pressure applied thereon by the operator, the feeder slide 60 is retracted, whereupon the lowermost ring of the stack or column thereof on the stack rod lowers into the applicator slideway. Upon the operator releasing the hand lever, the feeder slide 60 returns to its normal position under the action of spring 61, thus in effect picking off the lowermost ring of the stack and advancing it and all rings forwardly thereof in the slideway, such resulting in the most forward ring in the slideway being advanced to its "assembly-readiness" position.

It will be understood that without material modification the movement of the feeder slide 60 may be reversed; that is to say, the spring 61 may be arranged so as normally to maintain the feeder slide in its retracted position and the hand lever 62 may be arranged so as to actuate the feeder slide from its retracted position throughout its ring feeding stroke, against the force of the spring.

It is also possible to facilitate the more or less delicate operation of guiding a retaining ring into its shaft groove during its application by a ring dispensing and applying tool according to the Figs. 1–4 forms, by incorporating therein means for positively holding the tool so that it must perforce release the ring gripped in its ring receiving recess 14 directly to the shaft groove in which it is to be assembled. Referring to Fig. 11, illustrating a tool corresponding to that illustrated in Fig. 1, with guiding means added, it will be observed that one of the tool jaws designated 12a is extended forwardly of the ring recess 14 as a tongue 12b whose inner edge is formed straight and more or less in continuation of the side of the ring recess 14 defined by the jaw 12a. As seen in Fig. 13, the tongue 12b may be utilized as a tool guide by first engaging the tongue in the groove G of the shaft S in which a ring is to be assembled, and thereupon pushing the tool against the shaft while the tongue rides on the groove bottom. Such results in the lowermost (or endmost) ring in the tool recess being accurately lined up with the groove, thus relieving the operator to a great extent of the requirement of effecting this alignment solely by sight or tactually.

Ring dispensing and applying tools of the feeder slide type as described may also be supplied with means for centering and/or guiding the ring as it is being assembled in its shaft groove, thereby to facilitate the ring applying or assembling operation. Such a ring centering and/or guiding means is illustratively shown in Figs. 14–17e to be incorporated in a ring dispensing and applying tool of the Figs. 9 and 10 form, in which the feeder slide 60 is actuated manually as by a hand lever (not shown) corresponding to the previously described hand lever 62. Referring particularly to Fig. 15, the centering or guiding means comprises an elongated springy finger 82 extending forwardly from a frame 83 corresponding generally to the frame 40 of the Figs. 5–8 tool form but differing therefrom in that it is rigidly affixed to the rear portion of the applicator blade member 30 and to the cross head 32. As seen in Fig. 14, the finger 82 slopes downwardly from the frame 83 by an angle such that its free end which is formed as a spatula-like head 86 is disposed in the tool receiving recess 14c of the applicator when the tool is viewed in plan as in Fig. 15, and at a level slightly below that of the upper surface of the applicator jaws. Hence, said head 86 is adapted to exert a slight blocking and thereby a centering and guiding effect on a ring feeding into the ring recess 14c, and also to exert a slight downward pressure on the middle portion of the endmost ring of the slideway as the latter is pushed or fed forwardly from said recess. To insure smooth movement of a ring past the head 86, the head under surface 87, which connects its horizontal under face with the under side of the spring finger 82, is sloped as illustrated.

The functioning of ring centering and guiding means as aforesaid will be seen from a consideration of Figs. 17a–17e. In Fig. 17a said means is shown to have the same position as in Figs. 14–16, that is, its head 86 is contained within the inner circle of the ring in the "assembly readiness" position with the ring recess 14c of the applicator, and the underface of said head is below the upper surface of the ring. This results in the head 86 exerting some orienting function on the ring, as will be best seen from a consideration of Fig. 15. When now the tool is held against the shaft S with the ends of the endmost ring 50a which always project beyond the forward end of the ring recess 14c extending into the shaft groove G, and there- upon the feeder-slide retracting handlever is compressed and subsequently released, the endmost ring 50a is projected into the groove G, as in Fig. 17b. When this occurs, the tool is backed off slightly from the shaft S, consequent to the feed movement imparted to the rings in the applicator slideway, and also the ring designated 50b is advanced to the "assembly readiness" position formerly held by the now assembled ring 50a. As will be clear from Fig. 17b, during the projection of ring 50a from the recess 14c, the guide head 86 is of course cammed upwardly as provided by its rear-edge cam surface 87; but now it presses against the middle portion of said ring as the latter leaves the ring recess of the applicator, thereby guiding and steadying the ring during the short interval that it is being forced into its groove by the feed motion imparted to the series of rings in the applicator slideway. Upon the tool being backed from the shaft, the head 86 returns to its normal lowered position as in Figs. 14 and 17a, wherein it functions to guide and orient the said ring 50b as it is progressively advanced through its Figs. 18c, 18d and 18e positions by the aforesaid feed motion of the rings in the slideway. Thus, it will be seen that the guide finger 82 and its head 86 functions effectively not only to correct any misorientation of the rings traveling along the slideway between the ring stack and the ring receiving recess of the applicator member, but also, through its ability to exert slight resilient pressure downwardly against the middle portion of the endmost ring as it is being assembled in its shaft groove, additionally provides appreciable centering and guiding effect for said ring, the total effect being to insure that it is fully and properly seated upon withdrawal of the tool from the shaft following the applying operation.

Without further analysis, it will be appreciated that a retaining ring dispensing and applying tool according to the invention achieves the objectives therefor outlined in the foregoing. By combining the functions of the prior separate ring dispensing and applying means into a single tool or appliance which is fully portable and adapted to be carried about and operated by hand, the operation of assembling retaining rings is greatly simplified and expedited. A further advantage of the tool of the invention is that it not only stores a plurality of the retaining rings to be dispensed, but also that it effects the dispensing and assembly of single rings in automatic manner, responsively to the tool being properly presented to a work piece, such as a shaft having a groove in which a ring is to be assembled, or to the work piece being presented to the tool.

While various forms of retaining ring dispensing and applying tools operating on the principle of the invention have been illustrated and described, it is intended that all matter contained in the above description or shown in the accompanying drawings shall be interpreted as illustrative and not in a limiting sense.

I claim:

1. A tool for dispensing open retaining rings and applying them to grooved shafts and the like comprising, in combination, an applicator blade having a working end provided with a substantially semi-circular cut-out which opens through its end edge, the edge-defining wall of said cut-out having a step therein whereby the cut-out opening defines adjacent, substantially semi-circular smaller- and larger-diameter recess portions, of which the smaller-diameter recess portion has a radius slightly greater than that of the shaft on which ring assembly is to be effected as enables said working end to straddle the shaft and the larger-diameter recess portion has a radius coresponding substantially to that of the outer diameter of said rings thereby to define a ring-receiving recess for a ring lowering thereinto from above and which is closed on the bottom by the aforesaid step acting as a radially inward ring-supporting flange, the edge defining wall of the larger-diameter recess portion further defining a ring-engaging push shoulder having height not greater than the thickness of a ring for forcing the ring received in said ring-receiving recess into the groove of said shaft solely by bodily movement of the applicator held with its said working-end recess in the plane of said groove against the shaft to a position in which it straddles the latter, a stack rod for maintaining a supply of the rings to be applied in column formation above the applicator blade and having a flexible lower-end portion terminating just above the ring-receiving recess and being normally disposed in general axial alignment therewith, and means operative between the applicator blade and the upper-end portion of the stack rod for rigidly connecting said parts together as a working unit, the construction and arrangement being such that, when the applicator blade is moved bodily aginst the shaft as aforesaid, the lower rings of the ring column immediately above the recess move a limited distance rearwardly as permitted by the flexibility of the lower-end portion of the stack rod and hence do not interfere with the final movement of the applicator blade against the shaft, and that, upon retraction of the applicator blade from said shaft following completion of the ring-applying operation, said lower rings return to their initial position with return of said lower end portion of the stack rod to its normal position as enables the lowermost ring to drop by gravity into the then empty recess, thereby to condition the tool for the next ring dispensing and applying operation.

2. A tool substantially as set forth in claim 1, wherein said working end of the applicator blade comprises a pair of laterally spaced, arcuate jaws which together define the ring-receiving recess.

3. A tool substantially as set forth in claim 1, wherein said working end of the applicator blade comprises a pair of resiliently interconnected, arcuate jaws which conjointly define the ring-receiving recess.

4. A tool substantially as set forth in claim 1, wherein the end of the blade opposite its working end rigidly mounts a handle whereby the tool may be carried about and operated as a conventional bladed tool.

5. A tool substantially as set forth in claim 1, wherein the stack rod extends upwardly from the applicator blade substantially at a right angle thereto.

6. A tool substantially as set forth in claim 1, wherein the means for rigidly connecting the applicator blade and stack rod comprises an upright bracket extending between and fixed to both the upper face of the applicator blade and the upper end of the stack rod.

7. A tool substantially as set forth in claim 1, wherein the applicator blade carries a forwardly extending guide means having an effective edge disposed substantially in continuation of one side of the ring-receiving recess and being adapted to enter the shaft groove ahead of the ring then in said recess, thereby to pilot the tool during its final movement against the shaft as aforesaid.

8. A tool substantially as set forth in claim 7, wherein said guide means comprises a finger-like member having its inner side edge extending straightway and substantially in continuation of one side of said recess and being adapted to enter the shaft groove ahead of the ring then in the recess, thereby to pilot the tool in its final movement against the shaft as aforesaid.

References Cited in the file of this patent

UNITED STATES PATENTS

| | | |
|---|---|---|
| 1,073,280 | Owen | Sept. 16, 1916 |
| 1,596,678 | Miller | Aug. 17, 1926 |
| 2,172,847 | Nydegger et al. | Sept. 12, 1939 |
| 2,215,008 | Kuhnl | Sept. 17, 1940 |
| 2,312,502 | Testi | Mar. 2, 1943 |
| 2,480,037 | Luckins | Aug. 23, 1949 |
| 2,483,379 | Brell | Sept. 27, 1949 |
| 2,650,722 | Stabile | Sept. 1, 1953 |
| 2,712,398 | Erdmann | July 5, 1955 |
| 2,781,515 | Juilfs | Feb. 19, 1957 |